United States Patent
Chen

(10) Patent No.: US 8,208,734 B2
(45) Date of Patent: Jun. 26, 2012

(54) METHOD FOR ACQUIRING RESERVED BLOCK IN HOLOGRAPHIC STORAGE SYSTEM

(75) Inventor: Yin-Ying Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 1038 days.

(21) Appl. No.: 12/144,188

(22) Filed: Jun. 23, 2008

(65) Prior Publication Data

US 2009/0003647 A1    Jan. 1, 2009

(30) Foreign Application Priority Data

Jun. 29, 2007    (CN) .......................... 2007 1 0123527

(51) Int. Cl.
*G06K 9/76*  (2006.01)
*G06K 9/62*  (2006.01)
*G06K 9/36*  (2006.01)
*G06K 9/32*  (2006.01)
*G02B 5/32*  (2006.01)
*G03H 1/26*  (2006.01)
*G11C 13/04* (2006.01)

(52) U.S. Cl. ........ 382/210; 382/209; 382/287; 382/289; 382/294; 382/299; 359/16; 359/22; 365/125

(58) Field of Classification Search .................. None
See application file for complete search history.

(56) References Cited

U.S. PATENT DOCUMENTS 7,848,595 B2 *   12/2010   Ayres et al. .................. 382/294

* cited by examiner

*Primary Examiner* — Samir Ahmed
*Assistant Examiner* — Fred Hu
(74) *Attorney, Agent, or Firm* — Thomas, Kayden, Horstemeyer & Risley, LLP

(57) ABSTRACT

A method is provided for acquiring a reserved block in a holographic storage system. A symmetrical reference table is defined according to the characteristics of a known reference reserved block. Then, the differences between respective unit blocks and the reference reserved block are calculated according to the symmetrical reference table so as to determine total match scores for respective unit blocks. Consequently, the unit block having the highest match score is deemed as the reserved block.

9 Claims, 2 Drawing Sheets

METHOD FOR ACQUIRING RESERVED BLOCK IN HOLOGRAPHIC STORAGE SYSTEM

FIELD OF THE INVENTION

The present invention relates to a method for acquiring a reserved block in a holographic storage system, and more particularly to a method for quickly and effectively acquiring a reserved block in a holographic storage system.

BACKGROUND OF THE INVENTION

Many data storage media such as optical media or magnetic media have been developed to store data. With the increasing development of digitalized generation, the data storage density for the conventional data storage media is unsatisfactory. Nowadays, for dealing with such a problem, a holographic storage technology is developed by using holographic storage media to store data. A holographic storage medium has a largest capacity of about 3.9 TB (terabyte) among various storage devices. Perhaps, the holographic storage technology is succeeded after the HD-DVD or Blu-ray technology to be the most popular data storage technology.

In a typical holographic storage system, a laser beam is split into two beams by a beam splitter. These two beams are served as an object beam and a reference beam, respectively. The object beam and the reference beam are coherent. The object beam illuminates the object (pixel data or data page on data plane) and then the object scatters light onto the holographic storage medium. The object beam interferes with the reference beam to form an interference pattern such that a diffraction grating is recorded in the holographic storage medium. For reading pixel data from the holographic storage medium, the interference patterns recorded in the holographic storage medium are diffracted with the reference beam and thus a reconstructed object beam is obtained. Then, the reconstructed object beam is detected by a photo detector for obtaining the pixel data.

It is very important to remain optically stable in order for making and viewing a hologram. Any relative movement of the object beam and the reference beam may result in image shift when the pixel data are detected by the photo detector. Due to the image shift, the pixel data read from the holographic storage medium are inaccurate. For compensating the pixel data, a holographic storage system is disclosed in U.S. Patent Publication No. 2005/0286388, which is assigned to InPhase Technologies, Inc. and the contents of which are hereby incorporated by reference. In such a holographic storage system, predetermined reserved blocks are assigned throughout each data page. By searching the reserved blocks, the image shift is realized. According to the image shift, the position errors are determined. The pixel data are then compensated according to the corresponding position errors. Therefore, after a data page is received by the holographic storage system, it is very important to match a pattern of the data page to the predetermined reserved blocks. If the matching results are satisfied, pixel data may be accurately detected and further decoded.

U.S. Patent Publication No. 2005/0286388 also discloses a method of searching a reserved block. In accordance with InPhase's design, a reserved block having 8×8 pixel data of known pixel patterns is served as a reference reserved block. When an image file with 64×64 pixel data is read by the holographic storage system, a series of unit blocks with 8×8 pixel data are successively scanned and then correlations associated with respective unit blocks and the reference reserved block are calculated. The correlation between a specified unit block A and the reference reserved block B may be deduced by the following equation:

$$\text{Correlation} = \frac{\sum_m \sum_n (A_{mn} - \overline{A})(B_{mn} - \overline{B})}{\sqrt{\sum_m \sum_n (A_{mn} - \overline{A})^2 \cdot \sum_m \sum_n (B_{mn} - \overline{B})^2}}$$

In the above equation, $A_{mn}$ denotes the brightness intensity of the pixel at the m-th row and the n-th column of the specified unit block A, $B_{mn}$ denotes the brightness intensity of the pixel at the m-th row and the $n^{th}$ column of the reference reserved block B, $\overline{A}$ denotes the average pixels intensity of the unit block A, and $\overline{B}$ denotes the average pixels intensity of the reference reserved block B. Generally, the correlation between the unit block A and the reference reserved block B is ranged from 0 to 1. Ideally, the unit block A having correlation of 1 with respect to the reference reserved block B is the reserved block.

In the real application of the holographic storage system, however, the correlations for all unit blocks A with respect to the reference reserved block B are less than 1 because it is difficult to maintain optically stable. As a consequence, the unit block having the highest correlation with respect to the reference reserved block is usually deemed as the reserved block.

Since the computation associated with the correlation is very complicated, it is time-consuming to compute the correlations of all unit blocks with respect to the reference reserved block when an image file is received by the holographic storage system. In other words, since it takes much time to acquire a reserved block, the reading speed of the holographic storage system is very slow.

Therefore, there is a need of providing a method for quickly acquiring a reserved block in a holographic storage system so as to obviate the drawbacks encountered from the prior art.

SUMMARY OF THE INVENTION

The present invention provides a method for quickly acquiring a reserved block in a holographic storage system, thereby increasing the reading speed of the holographic storage system.

In accordance with an aspect of the present invention, there is provided a method for acquiring a reserved block in a holographic storage system. The method includes steps of defining a symmetrical reference table according to the characteristics of a known reference reserved block; calculating the differences between respective unit blocks and the reference reserved block according to the symmetrical reference table so as to determine total match scores for respective unit blocks; and discriminating the unit block having the highest match scores as the reserved block.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
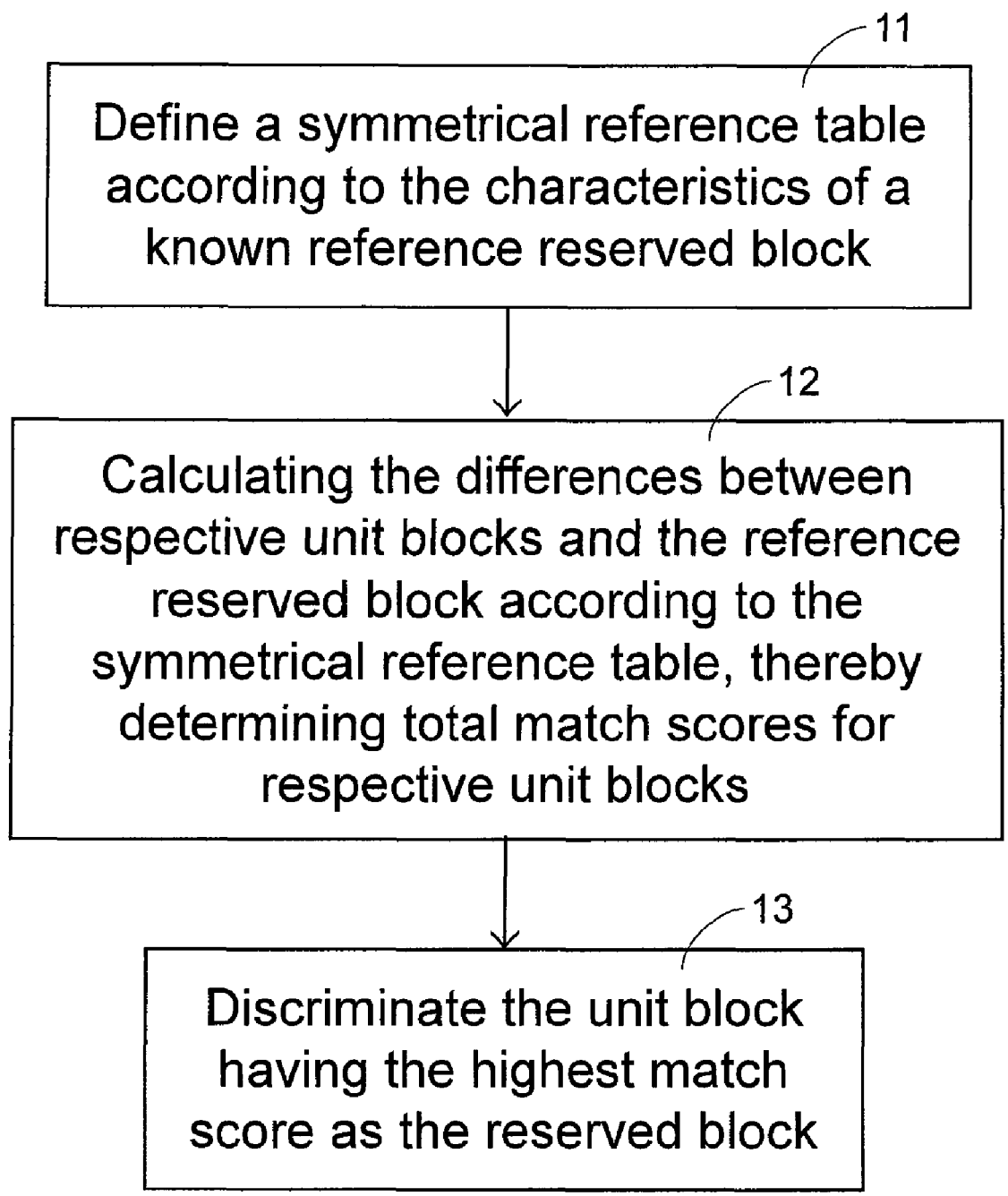
FIG. 1 schematically illustrates a flowchart of a method for quickly acquiring a reserved block in a holographic storage system according to the present invention.

For obviating the drawbacks encountered from the prior art, the present invention provides a method for quickly acquiring a reserved block in a holographic storage system. The method will be illustrated as follows with reference to a flowchart of FIG. 1.

First of all, a symmetrical reference table "RefTable" is defined according to the characteristics of a known reference reserved block (Step 11).

Figure 2:
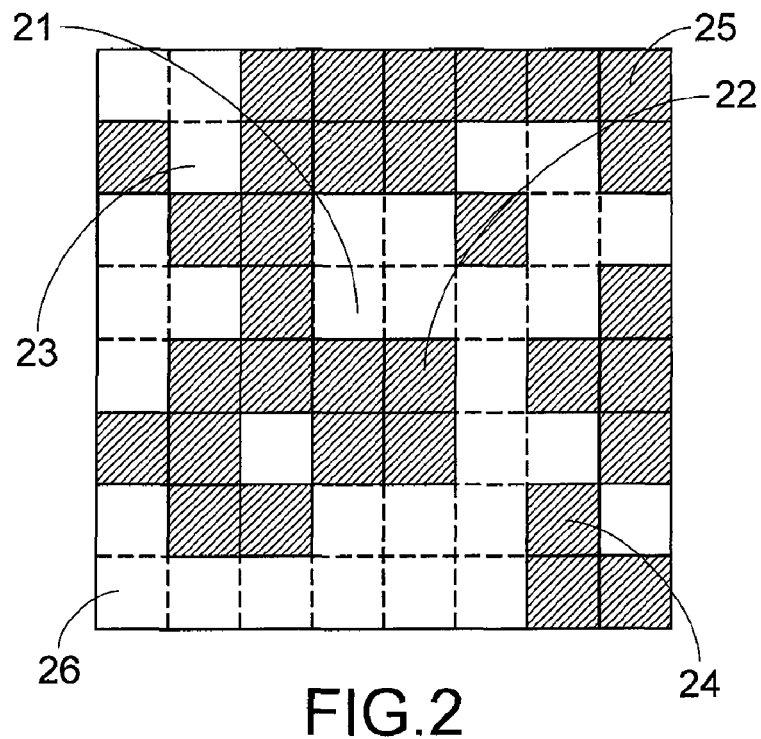
FIG. 2 schematically illustrates an exemplary reference reserved block of the present invention.

As described in InPhase's method, the reference reserved block is 8×8 pixel data on each data page with 64×64 pixel data. Assuming that an image with 1200×1200 pixel data is read by the holographic storage system, approximately 320 reference reserved blocks are present if some marginal reversed blocks are eliminated. The pixel data in the reference reserved block are arranged in diagonal symmetry. As shown in FIG. 2, the 8×8 pixel data in the reference reserved block are arranged in top left-bottom right symmetry or top right-bottom left symmetry. In other words, each pixel state is the bright-dark complement of the state of the pixel in the diagonally symmetric position. For example, if the pixels 21 and 23 are light spots, the pixels 22 and 24 which are respectively diagonally symmetric with respect to the pixels 21 and 23 are dark spots. In addition, if the pixel 25 is a dark spot, the pixel 26 which is diagonally symmetric with respect to the pixel 25 is a light spot. According to the diagonal symmetry of the reference reserved block, the symmetrical reference table "RefTable" is defined.

Due to the diagonal symmetry of the reference reserved block, the upper-half portion of the reference reserved block is utilized to acquire pixel alignment associated with the upper-half portions of a series of unit blocks. In a case that the reference reserved block contains 8×8 pixel data, the symmetrical reference table "RefTable" is a 4×8 matrix. Every entry in the matrix is denoted by a byte. Since noise is possibly introduced into the pixel data and it is usually difficult to recognize whether the pixels are light or dark spots, unsymmetrical and unclear pixels should be taken into consideration. In an embodiment, the dark pixel is denoted by a byte 1111 1111; the light pixel is denoted by a byte 0111 1111; the unsymmetrical pixel is denoted by a byte 0111 1000; and the unclear pixel is denoted by a byte 0000 0000.

Next, the differences between respective unit blocks and the reference reserved block are calculated according to the symmetrical reference table "RefTable", thereby determining match scores of respective unit blocks (Step 12).

Figure 3:
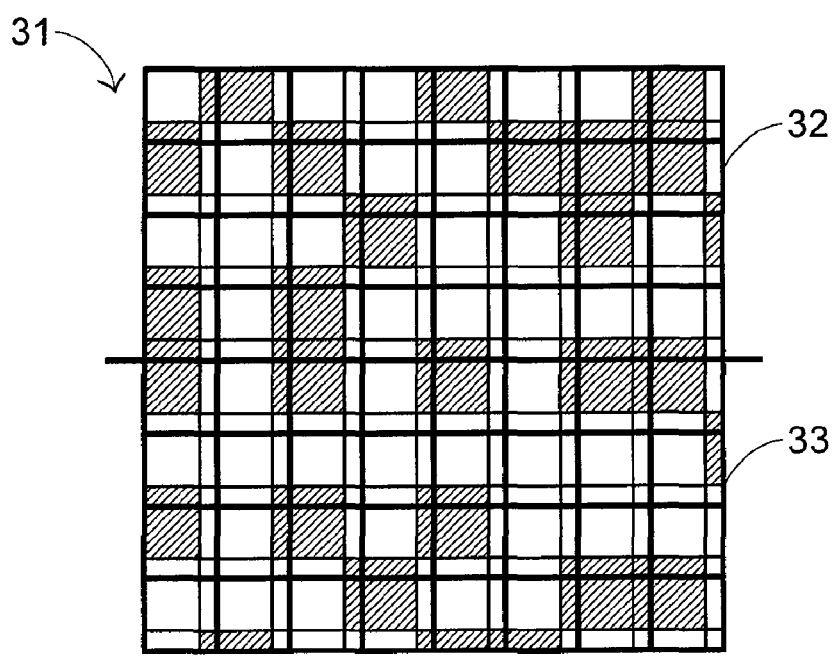
FIG. 3 schematically illustrates an exemplary unit block of the present invention.

Like the InPhase's method, the reference reserved block is 8×8 pixel data distributed on a grid of each data page with 64×64 pixel data according to the present invention. When an image file with 64×64 pixel data is read by the holographic storage system, a series of unit blocks with 8×8 pixel data are successively scanned. FIG. 3 schematically illustrates an exemplary unit block to be matched to the reference reserved block according to the method of the present invention. The unit block 31 contains 8×8 pixel data. Due to the diagonal symmetry of the reference reserved block, the match score of the upper-half portion 32 of the unit block 31 with respect to the upper-half portion of the reference reserved block is determined. Alternatively, it is also feasible to determine the match score of the lower-half portion 33 of the unit block 31 with respect to the lower-half portion of the reference reserved block.

In accordance with the present invention, the brightness values of the unit block are compared with those of the reference reserved block, thereby obtaining a brightness difference: Image(m,n)−Image(m',n'), in which Image(m,n) denotes the brightness value of the unit block for the pixel in the m-th row and the n-th column, and Image(m',n') denotes the brightness value of the reference reserved block for the pixel in the m-th row and the n-th column. Then, the brightness difference is multiplied by the symmetrical reference table "RefTable", thereby obtaining a symmetrical score. That is, for the pixel in the m-th row and the n-th column, the symmetrical score is equal to (Image(m,n)−Image(m',n'))× RefTable(m,n). If the symmetrical score is greater than a predetermined threshold value, the match score for the pixel in the m-th row and the n-th column is +1. Whereas, if the symmetrical score is less than the predetermined threshold value, the match score for the pixel in the m-th row and the n-th column is −1. Afterwards, a total match score of the upper-half portion 32 of the unit block 31 is obtained by computing the summation of the match scores of respective pixels.

In the above computation, the multiplication for obtaining the symmetrical score may be replaced by a logical exclusive-or (XOR) operation and a logical AND operation in order to alleviate hardware burden and enhance the reading speed of the holographic storage system. The process of obtaining the match scores of the 32 pixels in the upper-half portion 32 of the unit block 31 needs five operation cycles: (1) 32 subtraction (−) operations, (2) 32 logical XOR operations and 32 logical AND operations, (3) 32 greater-than (>) operations and 32 less-than (<) operations, (4) 32 subtraction (−) operations, and (5) 32 addition (+) operations. In the cycle 1, the subtraction (−) operations relate to the difference between the unit block and the reference reserved block. In the cycle 2, the logical XOR operations and the logical AND operations are employed to obtain the symmetrical score. In the cycle 3, the greater-than operations and the less-than operations are done to determined if the symmetrical score is greater than or less than the predetermined threshold value. By means of the subtraction operations in the cycle 4 and the addition operations in the cycle 5, the match score adds 1 or subtracts 1 according to the comparing result in the cycle 3.

According to U.S. Patent Publication No. 2005/0286388, however, more operation cycles are required to calculate the correlation between the unit block and the reference reserved block. For example, the process of calculate the correlation between the upper-half portion 32 of the unit block 31 and the reference reserved block needs eleven operator cycles: (1) 32 addition (+) operations, (2) 16 addition (+) operations, (3) 8 addition (+) operations, (4) 4 addition (+) operations, (5) 2 addition (+) operations, (6) 1 multiplication (×) operation, (7) 64×2 subtraction (−) operations, (8) 64×3 multiplication (×) operations, (9) 64×3 addition (+) operations, (10) 1 square-root operation, and (11) 1 multiplication (×) operation. In comparison with the method of U.S. Patent Publication No. 2005/0286388, the process of obtaining the match scores according to the present invention is very succinct. In addition, since the multiplication is replaced by a XOR operation and a logical AND operation, the process of obtaining the match scores according to the present invention has reduced computing time. Therefore, the method of the present invention is capable of quickly acquiring a reserved block in a holographic storage system.

After the total match scores for all unit blocks are calculated, the unit block having the highest total match score is deemed as the reserved block (Step 13). Consequently, pixel data may be accurately detected and further decoded.

From the above description, the symmetrical scores and the match scores for all pixels in the unit block are quickly obtained due to the diagonal symmetry of the reference reserved block. By finding the unit block having the highest total match score with respect to the reference reserved block, the reserved block is acquired. Since the process of obtaining the match scores according to the present invention is very succinct and simply in comparison with the conventional method, the reading speed according to the method of the present invention is largely enhanced.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for acquiring a reserved block in a holographic storage system, the method comprising steps of:
    defining a symmetrical reference table according to characteristics of a known reference reserved block;
    calculating differences between respective unit blocks and the reference reserved block according to the symmetrical reference table, thereby determining total match scores for respective unit blocks; and
    discriminating the unit block having the highest match scores as the reserved block wherein the differences are brightness differences, and the brightness differences between one of the unit blocks and the reference reserved block is determined by subtracting the brightness values of the reference reserved block from the brightness values of the unit block for the pixels in the same rows and the same columns; and
    the brightness differences are multiplied by the symmetrical reference table to obtain respective symmetrical scores for the pixels in the same rows and the same columns.

2. The method according to claim 1 wherein the unit blocks and the reference reserved block are 8×8 pixel data.

3. The method according to claim 1 wherein the pixels in the reference reserved block are arranged in diagonal symmetry.

4. The method according to claim 1 wherein the symmetrical reference table is defined according to the diagonal symmetry of the reference reserved block.

5. The method according to claim 1 wherein respective match scores of the pixels in the unit block are determined according to the symmetrical scores for the pixels in the same rows and the same columns.

6. The method according to claim 5 wherein the respective match score is +1 if the corresponding symmetrical score is greater than a predetermined threshold value, and the respective match score is −1 if the corresponding symmetrical score is less than the predetermined threshold value.

7. The method according to claim 6 wherein the total match score of the unit block is obtained by computing the summation of the respective match scores of the pixels in the unit block.

8. The method according to claim 1 wherein the multiplication for obtaining each of the symmetrical scores is implemented by a logical XOR operation and a logical AND operation.

9. The method according to claim 2 wherein the symmetrical reference table is a 4×8 matrix.

* * * * *